United States Patent [19]
Yuryan

[11] 3,762,106
[45] Oct. 2, 1973

[54] ATTACHMENT FOR BROACH SHARPENING MACHINE

[75] Inventor: Joseph B. Yuryan, Hudson, Mass.

[73] Assignee: The Lapointe Machine Tool Company, Hudson, Mass.

[22] Filed: Aug. 11, 1971

[21] Appl. No.: 170,877

[52] U.S. Cl............................... 51/241, 51/105 SP
[51] Int. Cl......................... B24b 19/00, B24b 5/26
[58] Field of Search...................... 51/241 R, 98 SP, 51/96, 105 SP

[56] References Cited
UNITED STATES PATENTS
2,113,287  4/1938  Baldenhofer................. 51/98 SP Primary Examiner—Othell M. Simpson
Attorney—Sewall P. Bronstein et al.

[57] ABSTRACT

An attachment adapted to be mounted on the transverse carriage of a broach sharpener for movement toward and from the longitudinal axis of a broach supported on the longitudinally movable carriage of the sharpener, said attachment comprising a first part mounted on the transverse carriage for angular adjustment about a horizontal axis transverse to the longitudinally movable carriage, a second part slidably mounted on the first part for rectilinear movement along an axis corresponding to the angular adjustment of the first part, mechanism including a Scotch yoke interengageably connecting the parts operable to effect harmonic movement of the second part relative to the broach supported on the longitudinally movable carriage, said movable part mounting an electric motor, drive spindle and grinding wheel, and locking mechanism embodied in the drive operable to hold the second part at any given position to which it is moved throughout its permitted movement toward and from the longitudinal center line of the broach without drift.

10 Claims, 8 Drawing Figures

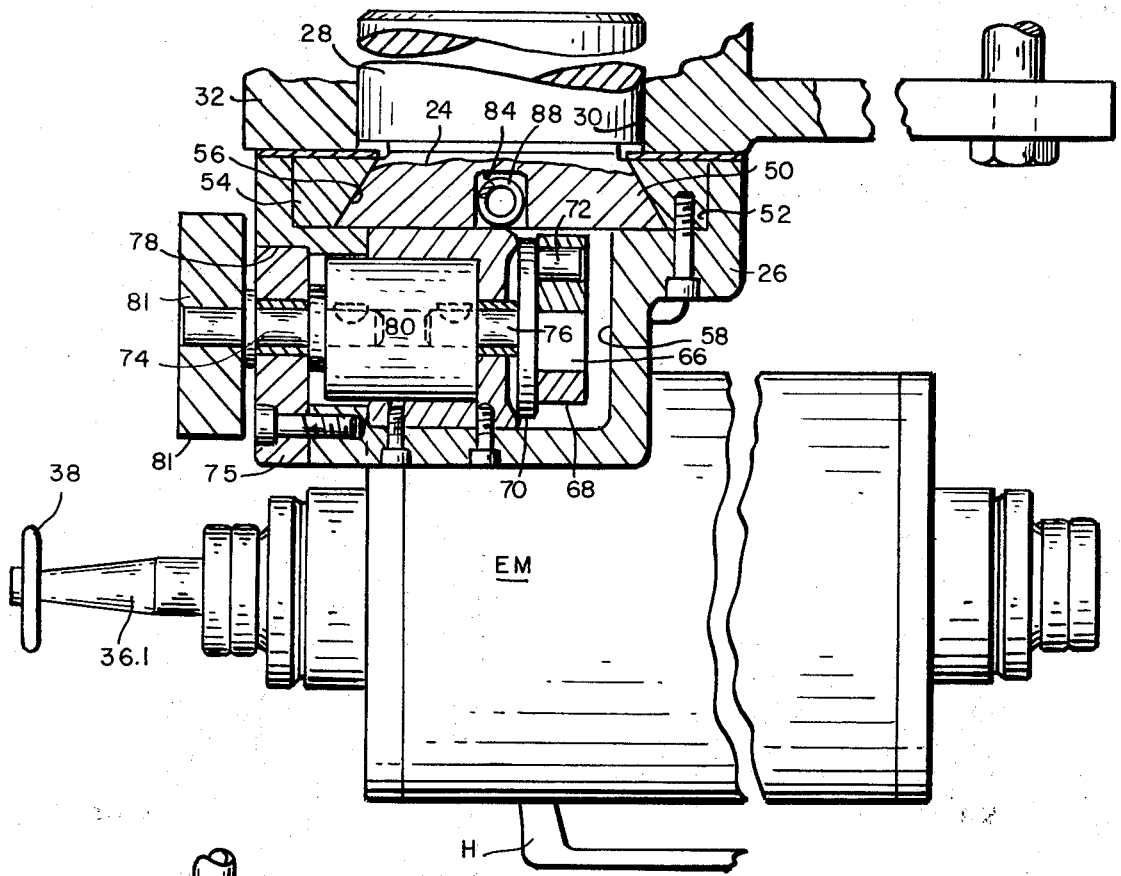
FIG. 4
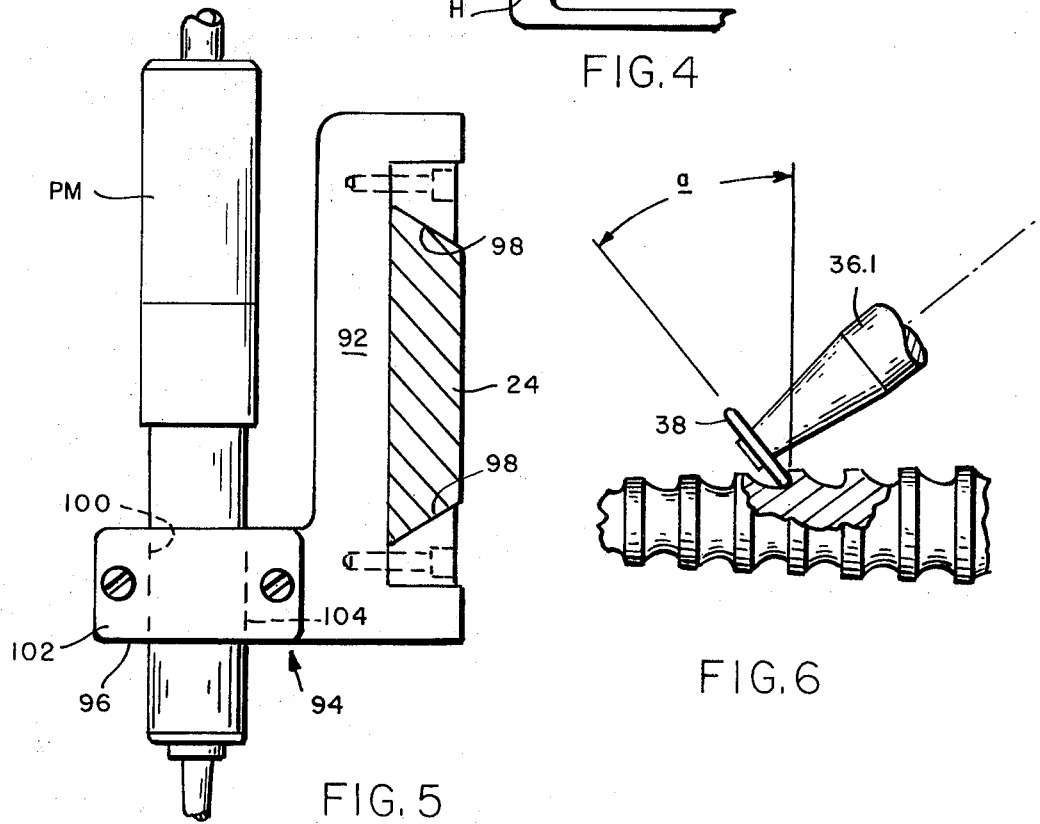
FIG. 5
FIG. 6

ATTACHMENT FOR BROACH SHARPENING MACHINE

BACKGROUND OF THE INVENTION

The conventional broach sharpening machine comprises a longitudinally movable carriage on which a broach is adapted to be mounted for grinding, a vertically movable carriage situated behind the longitudinally movable carriage and a transversely movable carriage supported at the upper end of the vertically movable carriage. The transversely movable carriage is adapted to mount, for the purpose of face grinding a broach of rectangular cross-section having straight teeth, a pneumatically driven grinding tool or, for a broach of circular cross-section having arcuate teeth, an electrically driven grinding tool. It is customary to effect grinding by mounting the broach to be ground on the longitudinally movable carriage, lower the tool by means of the vertical carriage to a position adjacent the teeth to be ground, and then to employ the transversely movable carriage for moving the tool back and forth across the faces of the teeth. The operation is not especially critical when grinding the flat faces of a broach of rectangular cross-section since the tool is traversed back and forth across the tops of the teeth which the operator can plainly see. However, when grinding the teeth of broaches of round cross-section the faces of the teeth which are to be ground are situated within the gullets between the teeth so that the cutting edge of the tool must be lowered to a position between the ends of the teeth and the roots thereof. Consequently, since the tool is advanced from the rear side of the workpiece, the workpiece tends to obscure the position of the tool hence making it difficult to move the tool into and out of the gullets between the teeth particularly if the teeth are relatively fine. The operation is also made more difficult by the fact that the cutting tool must be inclined at a rather sharp angle to the faces of the teeth to prevent damage to the edges of the teeth as the tool is entered and withdrawn and by the fact that the operator must manipulate the hand wheels which control the movement of the longitudinally and transversely movable carriages substantially simultaneously to bring the tool into and out of the tooth gullets without damage to the edges thereof.

Such apparatus has the further disadvantage in that whenever a change-over is to be made from end grinding of the teeth of a broach of rectangular cross-section by means of the pneumatically driven tool to the face grinding of a broach of circular cross-section by means of the electrically driven tool, the pneumatically driven tool must be dismounted from the transversely movable carriage and the electrically driven tool mounted thereon which entails the services of a licensed electrician.

This invention accordingly has for its purpose to alleviate the foregoing problems and this is achieved herein by means of an attachment which is adapted to be mounted to the transversely movable carriage above the longitudinally movable carriage, which attachment is adapted to provide for grinding either the flat faces of the teeth of broaches of rectangular cross-section or the curved faces of the teeth of broaches of circular cross-section.

SUMMARY

As herein illustrated, the attachment is mounted on the transverse carriage of a broach sharpener comprising a longitudinally movable carriage on which the broach is adapted to be mounted and a transverse carriage supported above the longitudinally movable carriage by a vertically movable carriage and comprises slidably interengaged parts, one of which is fixed to the transverse carriage and the other of which is movable relative to the one part, the movable part being adapted to mount an electric motor and drive spindle for a grinding tool for movement toward and from the longitudinally movable carriage by means of which the grinding tool may be entered into the tooth gullet of a round broach supported on the longitudinally movable carriage. There is means for drivably interconnecting the parts of such a kind as to provide for effecting harmonic movement of the movable part relative to the fixed part and to the broach. The drive includes means for locking the parts in any predetermined position of interengagement when unattended. The attachment is angularly adjustable about a horizontal axis transverse to the longitudinally movable carriage to enable disposing the electric motor and spindle in a position such that the tool will enter and leave the tooth gullet at an angle sharp enough so as not to cut into the edge of the tooth. For grinding the faces of flat or rectangular broaches an electrically driven spindle is employed, the axis of the spindle being disposed at a slightly greater tilt than the proper face angle of the tooth to be ground and the grinding operation is performed by keeping the vertical carriage at a fixed height, traversing the transverse carriage back and forth to carry the wheel along the face of the tooth and by advancing the longitudinal carriage from tooth-to-tooth. When used for this purpose the special features of the attachment herein illustrated are essentially superfluous. The important aspect of this apparatus is that with the attachment available it is quick and easy to convert to face grinding of rough or cylindrical broaches on centers with the electrically driven spindle while affording the facility for back-off grinding of flat or rectangular broaches by means of an air spindle.

The invention will now be described in greater details with reference to the accompanying drawings wherein:

FIG. 4 is a plan view of the attachment shown in FIG. 3 with parts in section;

FIG. 5 is an elevation of an attaching bracket for a pneumatically driven tool;

FIG. 6 is a fragmentary elevation showing the entrance angle of the tool into the tooth gullet of a round broach;

Figure 1:
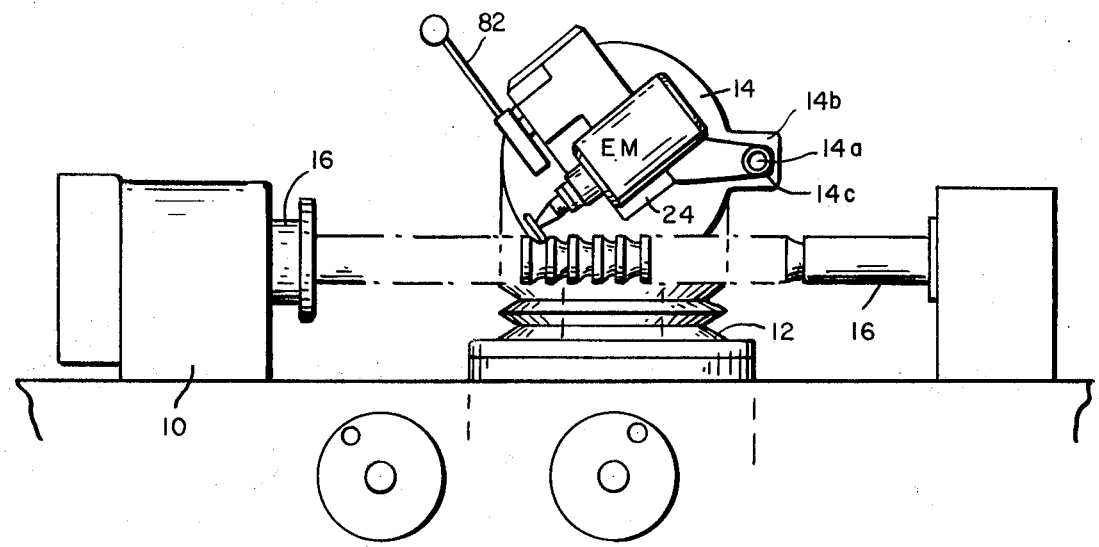
FIG. 1 shows the attachment in its capacity for sharpening the teeth of a round broach.
Figure 2:
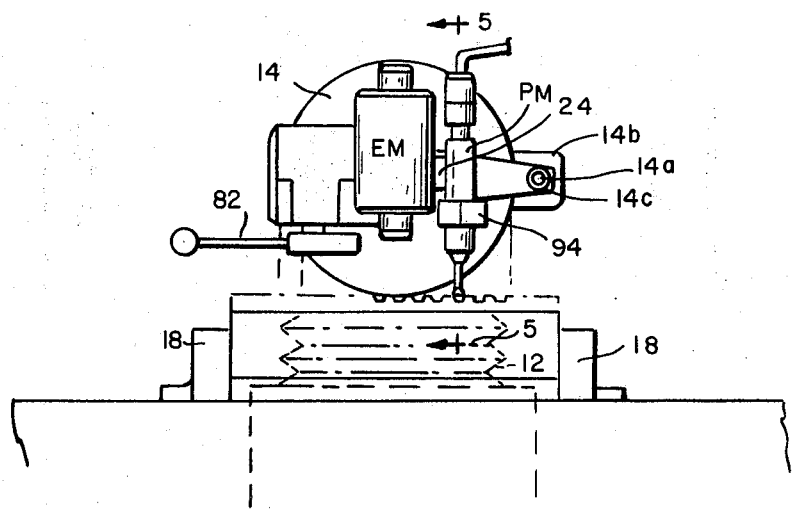
FIG. 2 shows the attachment in its capacity for sharpening the teeth of a broach of square cross-section.
Figure 3:
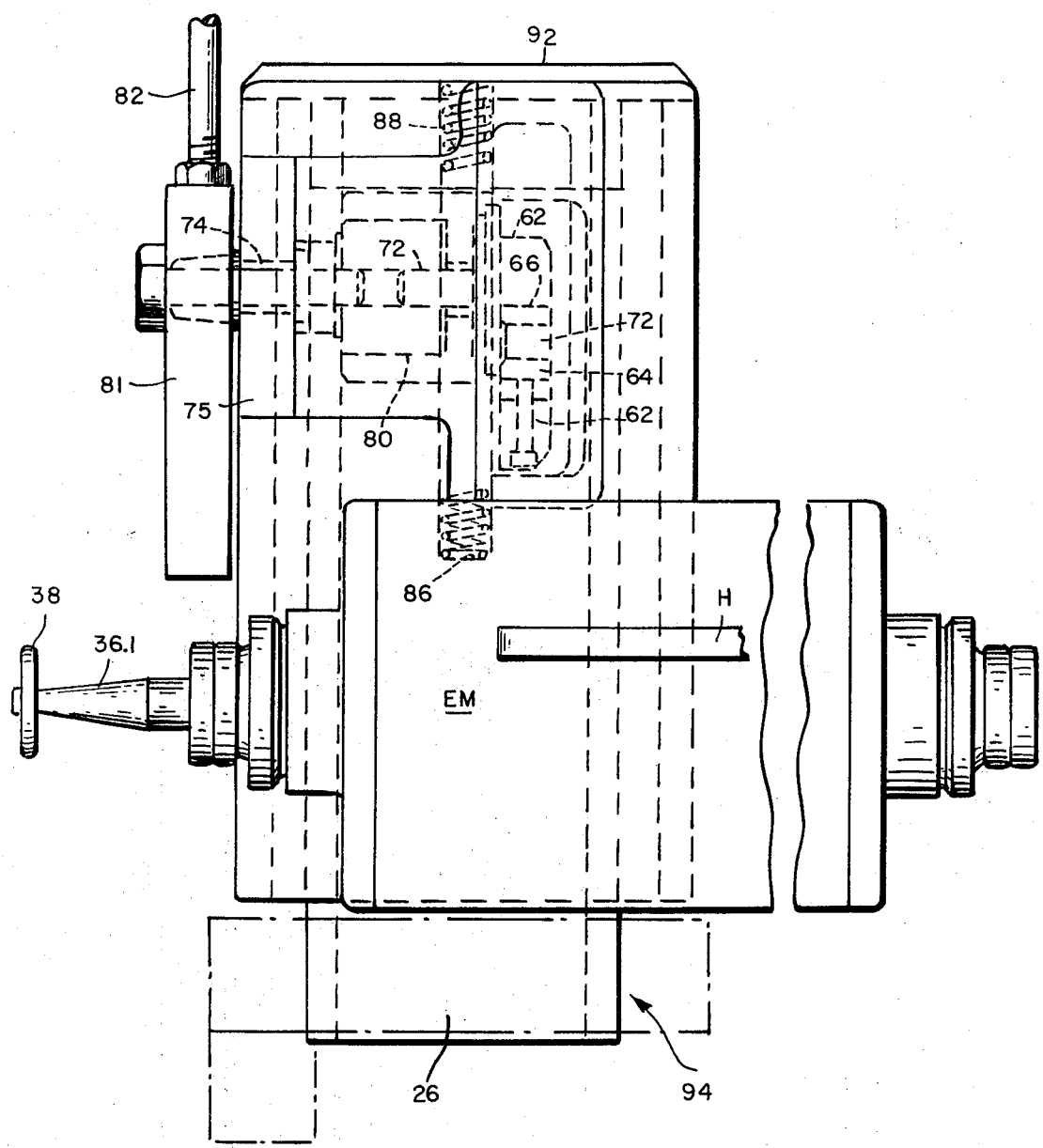
FIG. 3 is a front elevation of the attachment.

Referring to the drawings, in each of FIGS. 1 and 2, the longitudinally movable carriage is represented at 10, the vertically movable carriage at 12 and the transversely movable carriage at 14. Longitudinally spaced grinding centers 16—16 on the longitudinal carriage are provided for supporting a round broach. A magnetic chuck is fastened to the longitudinal carriage by clamp blocks 18—18 for supporting flat broaches. When the apparatus is to be used for face grinding of the teeth of the round broach, the transversely movable carriage is moved forwardly on the vertically movable carriage to a position above the longitudinal axis of the broach mounted on the longitudinally movable carriage and the vertically movable carriage is raised to a position which is slightly less than the vertical stroke provided by the attachment. The transversely movable carriage is fixed, for example, by a rod 14a extending through a hole in a part 14b by collars 14c—14c which are secured to the rod at each side of the part.

Referring to FIG. 4, the attachment comprises essentially slidably interengaged parts 24 and 26, the part 24 having intermediate its opposite ends at one side a cylindrical boss 28 of a diameter such as to closely fit within a cylindrical opening 30 defined by a clamp collar 32 carried by the forward end of the transverse carriage. The collar 32 is adapted to be constricted on the boss 28 by means of a clamp screw 34 having opposite threaded portions engaged within threaded sleeves 36—36 on the collar. The clamping engagement of the collar with the boss 28 enables turning the part 24 about a horizontal axis x—x which is transverse to the longitudinally movable carriage. The part 26 when interengaged with the part 24 is movable relative to the part 24 longitudinally thereof and is designed to support an electric motor EM which has a drive shaft containing a tapered bore in which the spindle 36.1 of a grinding tool 38 is mounted. To this end the part 26 has at its lower end a circular recess 40 containing bolt holes 42 for receiving a mounting plate 44 on the motor housing in which there are bolt holes 46. The motor EM is bolted in recess 40 by means of bolts 48 inserted through the bolt holes with the axis of the motor drive shaft substantially at right angles to the longitudinal axis of the parts 24 and 26.

Slidable interengagement of the parts 24 and 26 is provided for by longitudinally extending bevels 50—50 (FIG. 4) at the opposite edges of the part 24 and a recess 52 in the part 26 which has at its opposite sides gibs 54—54 providing re-entrant grooves 56—56 for receiving the beveled edges 50—50 of the part 24.

Figures 7, 8:
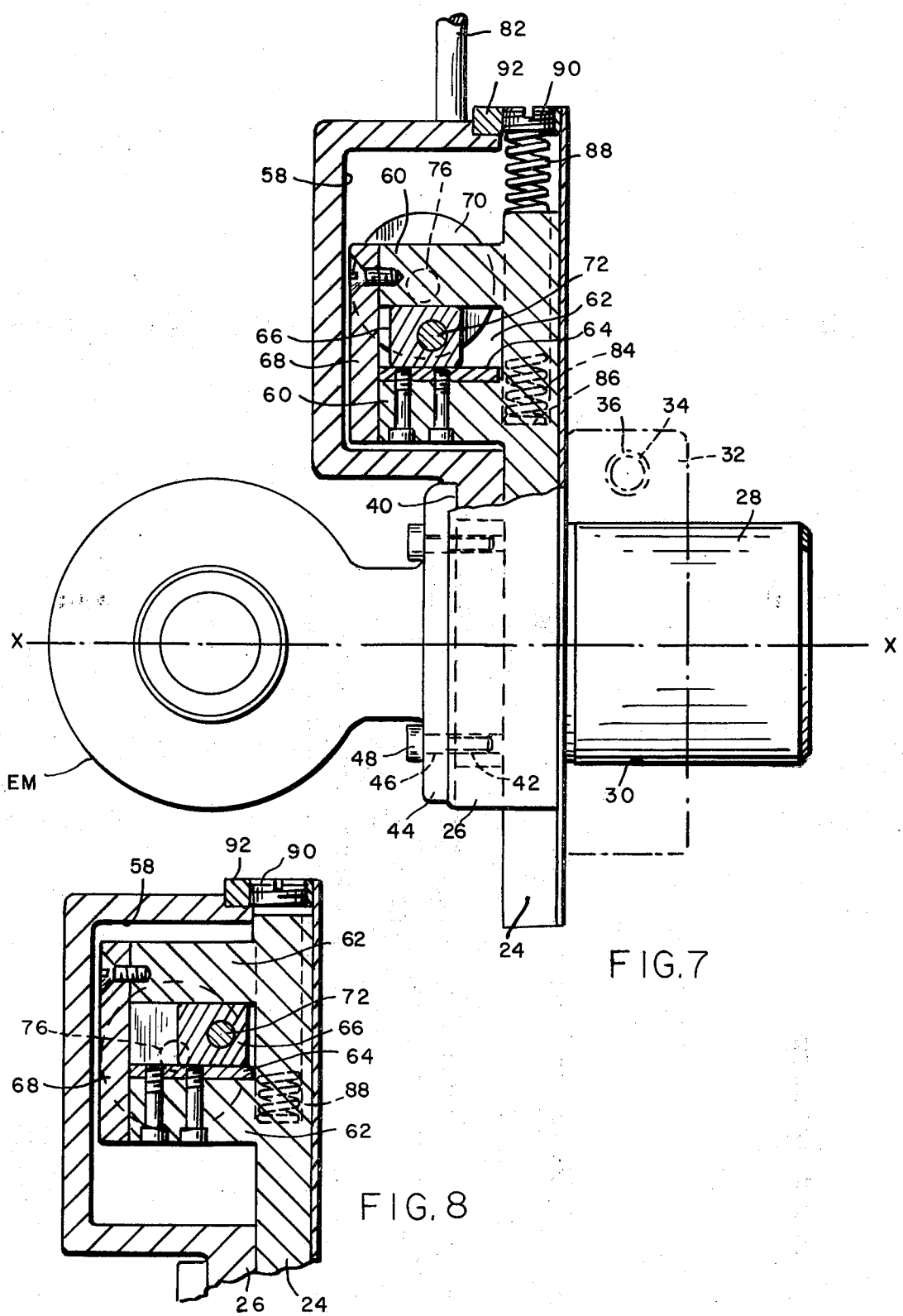
FIG. 7 is a side elevation partly in section taken from the right side of FIG. 4 showing the eccentric in its uppermost position.
FIG. 8 is a fragmentary section corresponding to the upper part of FIG. 7 showing the eccentric in its lowermost position.

Relative movement of the parts 24 and 26 for moving the grinding wheel into and out of the tooth gullets is provided for by a Scotch yoke coupling, the elements of which are situated between the parts 24 and 26 within a chamber 58 at the upper end of the part 26. Referring to FIG. 7 the components of the Scotch yoke comprise a yoke, a slide, an eccentric and a drive shaft. The yoke comprises spaced parallel arms 60—60 at the inner side of the part 24 which project therefrom into the chamber and which provides a way 62. The lower arm 60 may have affixed thereto a bearing plate 64. The slide is a block 66 disposed between the arms for sliding therebetween and is retained by a plate 68 bolted to the ends of the arms. The eccentric is a disc 70 to which is fixed at a predetermined distance from its center a pin 72. The block 66 contains a hole of a size to rotatably receive the pin 72 and the disc is mounted on a drive shaft 76 so that by rotation of the shaft the eccentric will effect reciprocal movement of the parts 24 and 26 relative to each other. The characteristic of the Scotch yoke coupling as thus described is that it provides for harmonic movement. The stroke of the eccentric is such as to move the tool into cutting engagement with the teeth from the height of the transverse carriage above the broach.

The shaft 76 is rotated by means of a shaft 74 (FIG. 4) journeled in a bearing plate 75 bolted over an opening 78 in a wall of the chamber 58 through the intermediary of a drive clutch 80, to the input side of which is keyed the shaft 74 and to the output side of which is keyed the shaft 76. The outwardly projecting end of the shaft 74 has mounted on it a handle block 80 to which there is fixed one end of a handle 82.

The drive clutch 80 is a mechanism commonly known as a REV-LOK which is a reverse locking clutch which has the dual function of torque locking and positioning. The mechanism is available in various forms, one of which may be purchased from the Formsprag Company of Warren, Michigan. Rotation of the REV-LOK mechanism by means of the shaft 74 at the input side thereof effects rotation of the shaft 76 at the output side thereof in such a way that if the handle 82 is released by the operator at any position, the device will automatically lock the eccentric in the position it occupied at the moment of release to prevent further relative movement of the parts. This particular device enables moving the tool to and from the work without danger of the weight of the parts causing them to drift if left unattended with the possibility of the cutting tool crashing into the edge of the tooth and thereby damaging the work.

It is desirable to counterbalance the weight of the part 26 and electric motor EM and, hence, the part 24 has in its inner face and extending downwardly from its upper end a slot 84 providing at its lower end a seat 86 within which there is mounted a spring 88 with its lower end resting on the bottom and its upper end held under compression by a screw-threaded plug 90 screwed into a block 92 at the top of the housing 58.

The up and down movement of the part 26 relative to the part 24 is limited by the eccentricity of the pin 72 so that the lowermost position of the part 26 coincides with the lowermost position of the eccentric pin thereby providing for a harmonic approach of the tool into engagement with the work.

As previously related and as shown in FIG. 6 the cutting tool must be brought into the tooth gullet at a sharper angle than the face angle of the teeth so as not to damage the edge of the tooth and this is provided for by adjusting the entire assembly about the axis x-x so as to dispose the electric motor EM in a position with the spindle 36.1 inclined to the axis of the broach at an angle such that the tool as it is lowered and raised by moving the handle 82 forwardly and rearwardly will be moved into and out of the tooth gullet at an angle a relative to the vertical and so clear the edge of the tooth without cutting into it. When the tool has been advanced into the tooth gullet cutting is achieved by manipulation of the longitudinally movable carriage to face off the desired amount of material.

The attachment is adapted to be used for back off grinding operation without dismounting it and the motor driven spindle by the rotating the attachment to dispose the part 24 in a substantially horizontal position and mounting a motor driven spindle on the part 24 in a substantially vertical position. This is accomplished by moving the part 26 to the extreme left-hand position on the part 24 to expose the right-hand end of the part 24 and mounting a bracket 94, FIG. 5 having right angularly disposed arms 92 and 96 on the exposed portion of the part 24. The arm 92 contains re-entrant grooves 98—98 and the arm 96 contains a half-round opening 100. The bracket is adapted to be mounted on the right-hand end of the part 24 by sliding it onto the end thereof to engage the grooves 98—98 with the bevels 50—50 and clamping it thereto. A cap 102 containing a half-round opening 104 is adapted to be bolted to the arm 96 to clamp a motor driven spindle herein shown as a pneumatic motor PM to the clamp bracket. In the horizontal position of the bracket the electric motor EM and the pneumatic motor PM are both in a vertical position. The spindle 36.1 for the tool 38 is removed from the electric motor shaft when using the pneumatically driven tool for back off operations. The electric motor EM has on its side, a handle H which enables moving the pneumatically driven tool to effect raising and lowering the carriage and traversing the tool forwardly and rearwardly.

The machine as thus equipped can be used for sharpening cylindrical type broaches much faster than hereafter possible, and minimizes grinding time and operator fatigue by eliminating coordinated cranking of the horizontal and transverse hand wheels, without reducing its efficiency for grinding flat top broaches and broach inserts. The attached also eliminates possible accidental damage to the broach by downward drift of the grinding wheel into engagement with the tool as the operator is traversing the horizontal carriage or has left the machine unattended, enables the operator to obtain a closer feel by providing a slower rate of descent at the lower end of the down feed and provides for substantially the same effort in feeding the tool into and out of operative position.

It should be understood that the present disclosure is for the purpose of illustration only and that this invention includes all modifications and equivalents falling within the scope of the appended claims.

I claim:

1. An attachment for the transverse carriage of a broach sharpener comprising a longitudinally movable carriage adapted to support a broach for sharpening for longitudinal movement, and a transverse carriage supported above the longitudinally movable carriage, said attachment being mounted on the transverse carriage above the longitudinal center line of the broach and comprising slidably interengaged parts, one of which is fixed to the transverse carriage and the other of which is movable relative thereto, said movable part being adapted to support a motor and drive spindle with the axis of the spindle in a plane containing the longitudinal center line of the broach for movement toward and from the broach, means drivably interconnecting the parts for effecting movement of the movable part and hence the spindle toward the broach, and means counter-balancing the combined weight of the movable part, motor, spindle and grinding wheel such that the force required to effect movement of the movable part in either direction is substantially the same.

2. An attachment for the transverse carriage of a broach sharpener comprising a longitudinally movable carriage adapted to support a broach for sharpening for longitudinal movement, and a transverse carriage supported above the longitudinally movable carriage, said attachment being mounted on the transverse carriage above the longitudinal center line of the broach for angular movement about a horizontal axis transverse to the longitudinal center line of the broach and comprising slidably interengaged parts, one of which is adapted to be fixed to the transverse carriage at a predetermined angular position of adjustment and the other of which is movable relative thereto along the line of angular disposition of the fixed part, said movable part being adapted to support a motor and drive spindle with the axis of the drive spindle in a plane containing the longitudinal center line of the broach and inclined thereto at the angle of adjustment of the parts, means for drivably interconnecting the parts for harmonic movement of the spindle toward and from a broach on the longitudinally movable carriage, operator-actuated means for effecting operation of the drive means, and means operable upon release of the operator-actuated means to lock the movable part relative to the fixed part at any position in its movement relative to the fixed part.

3. Apparatus according to claim 2, comprising means interengageably disposed between the parts operable to counterbalance the combined weight of the movable part, motor and spindle.

4. Apparatus according to claim 2, comprising means for limiting movement of the movable part relative to the fixed part in the direction of movement toward the broach.

5. An attachment for the transverse carriage of a broach sharpener comprising a longitudinally movable carriage adapted to support a broach for sharpening for longitudinal movement, and a transverse carriage supported above the longitudinally movable carriage transverse to the longitudinal center line of the broach, said attachment comprising a first part mounted on the transverse carriage and adjustable thereon about a horizontal axis transverse to the longitudinal center line of the broach, a second part slidably interengaged with the first part for angular adjustment therewith and rectilinear movement relative thereto, said second part being adapted to support a motor and spindle with the axis of the spindle in a plane containing said longitudinal center of the broach, a driving connection between the first and second parts for effecting relative movement comprising a Scotch yoke by means of which movement of the second part relative to the first part is harmonic, a handle for effecting operation of the Scotch yoke and a "rev-lok" interposed between the handle and the Scotch yoke operable to hold the Scotch yoke in any position in which the handle is released such that the movable part will remain in a fixed position until the handle is again moved.

6. An attachment for the transverse carriage of a broach sharpener comprising a longitudinally movable carriage adapted to support a broach for sharpening for longitudinal movement, a vertically movable carriage, a transversely movable carriage supported by the vertically movable carraige above the longitudinally movable carriage, said transversely movable carriage mounting the attachment above the longitudinal center line of the broach, means for fixing the vertical and transverse carriages in predetermined positions, said attachment comprising slidably interengaged parts, one of which is fixed to the transverse carriage and the other of which is movable relative to the one part, said movable part being adapted to mount a motor and drive spindle for a grinding tool for movement toward and from the longitudinal center line of the broach by means of which the tool may be entered into the tooth gullet, and means drivably interconnecting the parts for effecting harmonic movement of the movable part and the fixed part relative to the supported broach.

7. Apparatus according to claim 6, wherein the attachment is adapted to be rotated to position said one part in parallel relation to the longitudinally movable carriage, and wherein there is means for mounting on said part a pneumatic motor with tool in a vertically disposed position and wherein by disabling the means for fixing the transversely movable carriage said tool may be traversed back and forth across a broach mounted on the longitudinally movable carriage.

8. An attachment for the transverse carriage of a broach sharpener comprising a longitudinally movable carriage adapted to support a broach for sharpening and a transversely supported carriage for supporting said attachment above the longitudinally movable carriage, said attachment comprising slidably interengaged parts movable rectilinearly in a predetermined direction relative to each other, means fixing one of said parts to the transverse carriage, the other of the parts being movable relative to the one part, said movable part being adapted to mount a motor and drive spindle for a grinding wheel for movement toward and from the longitudinal center line of thr broach by means of which the grinding wheel may be entered into the tooth gullet of a broach supported on the longitudinally movable carriage, means counterbalancing the weight of said other part including the motor and drive spindle, lever-actuated means drivably interconnecting the parts for effecting harmonic movement of the movable part relative to the fixed part, and a reverse locking clutch included in said means drivably interconnecting the parts.

9. An attachment for the transverse carriage of a broach sharpener comprising a longitudinally movable carriage adpated to support a broach for sharpening and a transversely supported carriage for supporting said attachment above the longitudinally movable carriage, said attachment comprising slidably interengaged parts movable rectilinearly in a predetermined direction relative to each other, means fixing one of said parts to the transverse carriage, the other of the parts being movable relative to the one part, said movable part being adapted to mount a motor and drive spindle for a grinding wheel for movement toward and from the longitudinal center line of the broach by means of which the grinding wheel may be entered into the tooth gullet of a broach supported on the longitudinally movable carriage, a spring supported at its ends between the parts counterbalancing the weight of said other part including the motor and the drive spindle, and means drivably interconnecting the parts for effecting harmonic movement of the movable part relative to the fixed part, comprising a yoke on the fixed part having a rectilinear way transverse to the direction of relative movement of the parts, an eccentric engaged with said way, means mounting the eccentric on the movable part for rotation about an axis perpendicular to said way, and a handle fixed to the eccentric for effecting rotation thereof.

10. An attachment according to claim 9, comprising a reverse locking clutch connecting the handle to said eccentric.

* * * * *